United States Patent
Atkinson, Jr.

[11] Patent Number: 6,062,348
[45] Date of Patent: May 16, 2000

[54] RAPIDLY-DEPLOYABLE VEHICLE SNOW CHAIN SYSTEM HAVING INDIVIDUALLY-REPLACEABLE INTERLOCKING CHAIN ATTACHMENT PLATES

[76] Inventor: John H. Atkinson, Jr., 306 S. 1680 West, Provo, Utah 84601

[*] Notice: This patent issued on a continued prosecution application filed under 37 CFR 1.53(d), and is subject to the twenty year patent term provisions of 35 U.S.C. 154(a)(2).

[21] Appl. No.: 08/985,029

[22] Filed: Dec. 4, 1997

[51] Int. Cl.⁷ .................................................. B60T 1/00
[52] U.S. Cl. .......................... 188/4 B; 152/222; 180/16; 280/757; 188/4 R
[58] Field of Search ................... 188/4 B, 4 R, 188/218 XL; 280/757; D12/154; 180/15, 16; 301/40.2, 42, 41.1, 6.1; 152/222, 208, 231, 232, 233, 215, 214, 221; 293/7, 1, 3

[56] References Cited

U.S. PATENT DOCUMENTS

| | | | |
|---|---|---|---|
| D. 286,524 | 11/1986 | Hårdmark | 188/4 R |
| 1,045,609 | 11/1912 | Putnam | 188/4 R |
| 1,150,148 | 8/1915 | Putnam | 188/4 R |
| 1,223,070 | 4/1917 | Putnam | 188/4 R |
| 1,374,252 | 4/1921 | Thorne et al. | 188/4 R |
| 1,381,001 | 6/1921 | Norman | 188/4 R |
| 1,975,325 | 10/1934 | Lisella et al. | 188/4 R |
| 2,241,923 | 5/1941 | Ridgway | 188/4 R |
| 2,264,466 | 12/1941 | Weisel | 188/4 R |
| 2,277,036 | 3/1942 | Chaussee | 188/4 R |
| 2,283,948 | 5/1942 | Ridgway | 188/4 R |
| 2,442,322 | 5/1948 | Daley | 188/4 R |
| 2,780,315 | 2/1957 | Robinson | 188/4 B |
| 3,605,968 | 9/1971 | Ely | 188/218 XL |
| 3,698,519 | 10/1972 | Crossman | 188/218 XL |
| 3,738,457 | 6/1973 | Dowell | 188/218 XL |
| 4,155,432 | 5/1979 | Krause | 188/218 XL |
| 4,299,310 | 11/1981 | Törnebäck | 188/4 R |

FOREIGN PATENT DOCUMENTS

| | | | |
|---|---|---|---|
| 266487 | 11/1912 | Germany | 188/4 R |
| 3736137 | 5/1989 | Germany | 188/4 B |

Primary Examiner—Douglas C. Butler
Attorney, Agent, or Firm—Angus C. Fox, III

[57] ABSTRACT

An improved snow chain system for wheeled vehicles that can be rapidly deployed and rapidly retracted, includes a rotatably-mounted friction drive disc having a circumferential edge that is pressure biased against the sidewall of a tire. Multiple arcuate chain attachment plates, which interlock much like a laminar puzzle, are placed end-to-end to form a ring-shaped unit. The ring-shaped unit is held together and to a planar surface on the friction drive disc by a plurality of bolts, each of which passes through a single attachment plate and through the friction drive disc. Each arcuate attachment plate has either one or two chain segments attached thereto. In the case where only a single chain segment is attached, a U-shaped anchoring chain link is welded to the attachment plate. In the case of attachment of a pair of chain segments, a M-shaped anchoring link is employed. The invention facilitates replacement of individual chain segments or chain segment pairs while retaining structural integrity of the circular ring.

17 Claims, 3 Drawing Sheets

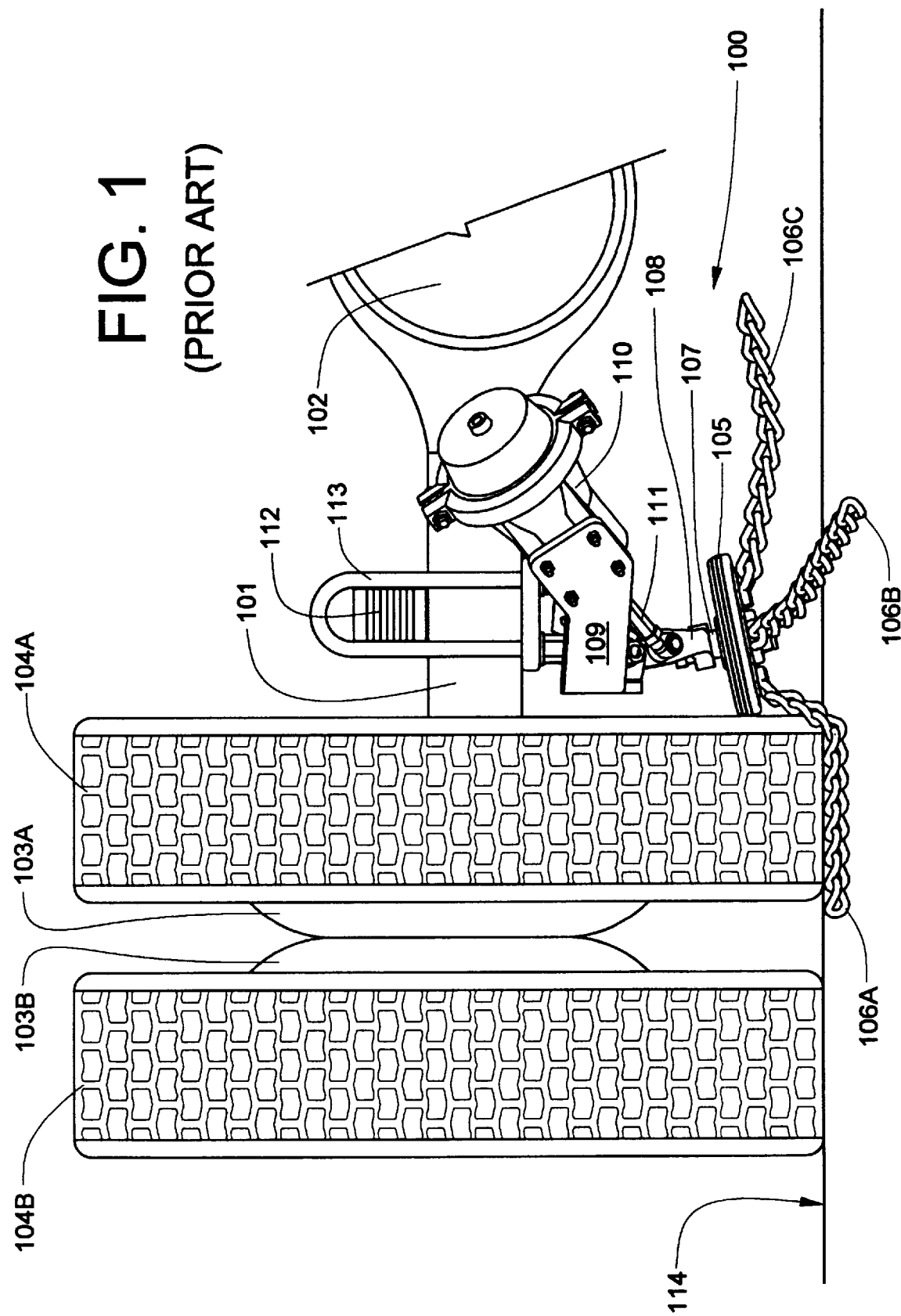

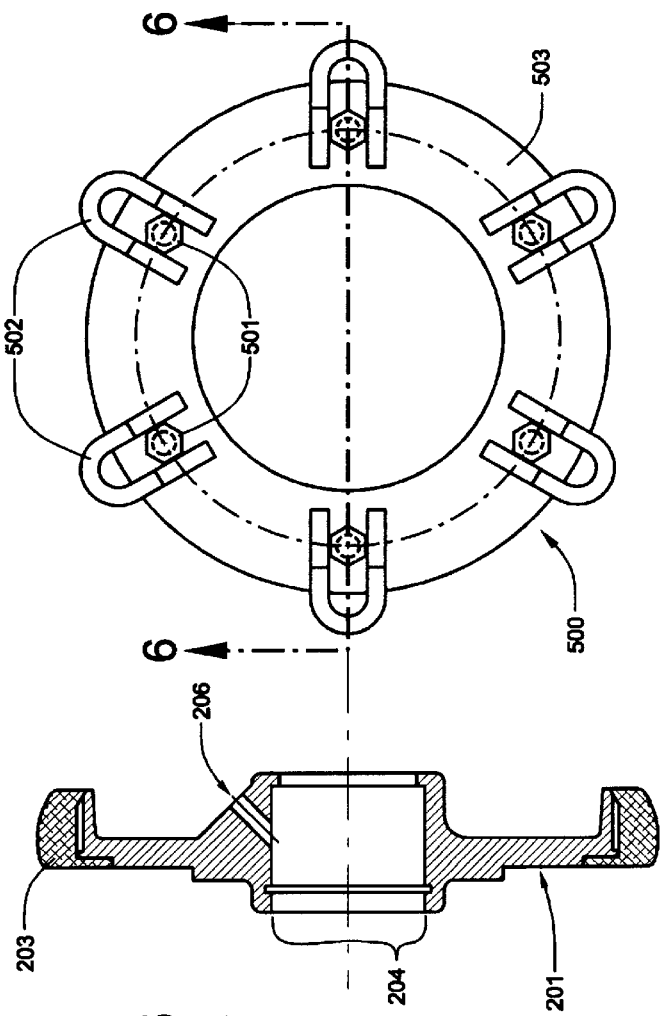
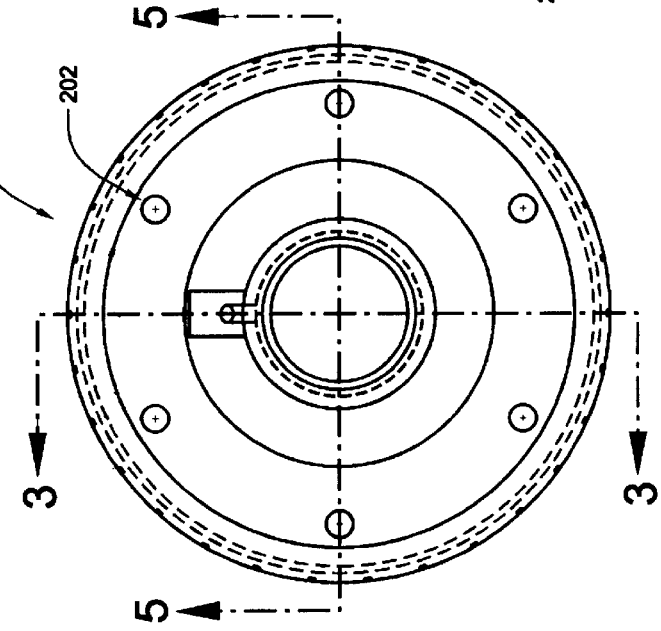
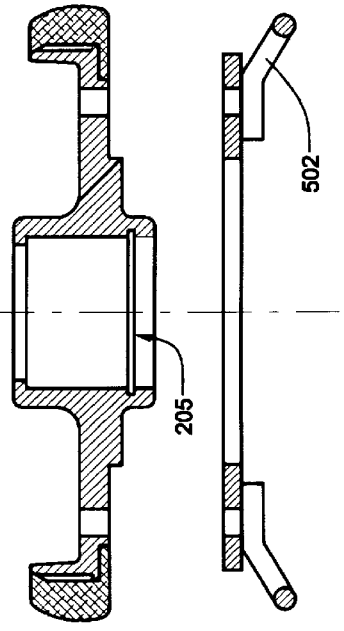

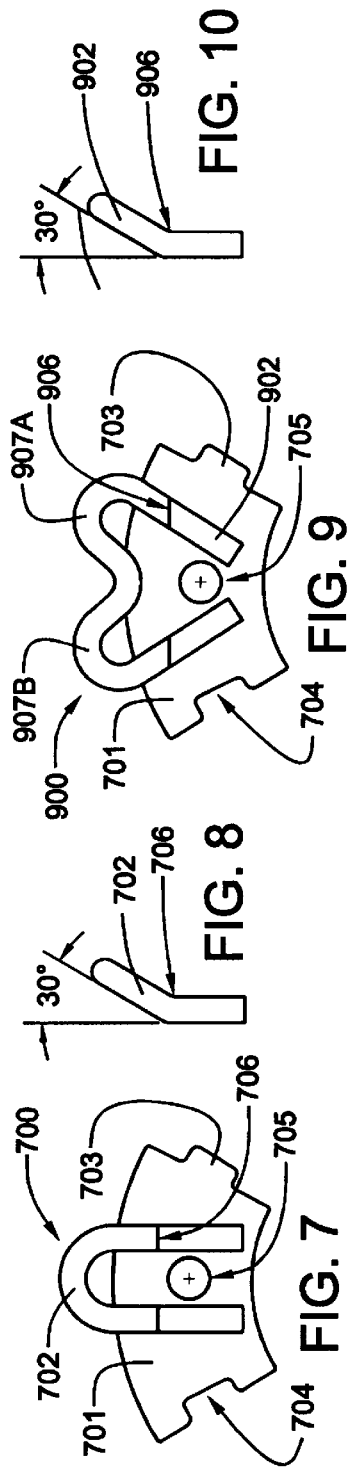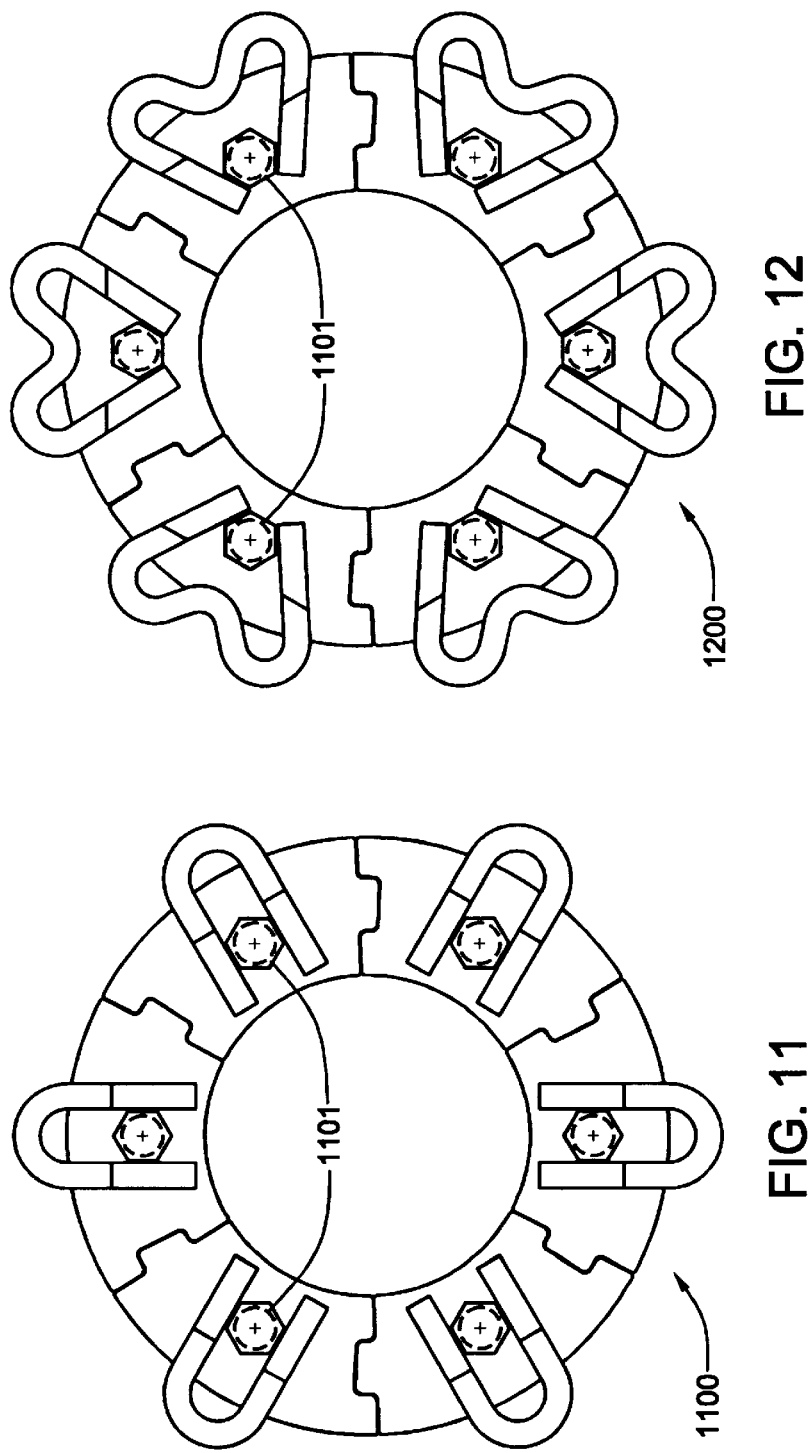

RAPIDLY-DEPLOYABLE VEHICLE SNOW CHAIN SYSTEM HAVING INDIVIDUALLY-REPLACEABLE INTERLOCKING CHAIN ATTACHMENT PLATES

BACKGROUND OF THE INVENTION

1. Field of the Invention

This invention relates to vehicle snow chain systems which may be both rapidly deployed and rapidly retracted. More particularly, it relates to chain attachment devices for such systems.

2. Description of Related Art

Rapidly-deployable snow chain systems, which may be characterized generally as systems which fling short chain segments beneath a road tire, have been known for more than 85 years. Such a system is disclosed in U.S. Pat. No. 1,045,609 and in German Pat. No. No. 266,487 to W. H. Putnam for an ANTISKIDDING DEVICE. Throughout the years, various modifications and improvements have been made by numerous inventors. The following list is a representative list of a dozen other U.S. patents issued in this field:

- U.S. Pat. No. 1,150,148 for a TRACTION AND ANTI-SKIDDING DEVICE;
- U.S. Pat. No. 1,223,070 for an ANTISKIDDING DEVICE FOR VEHICLES;
- U.S. Pat. No. 1,374,252 for an ANTISKID DEVICE FOR AUTOMOBILES;
- U.S. Pat. No. 1,381,001 for a NON-SKID DEVICE FOR MOTOR AND OTHER VEHICLES;
- U.S. Pat. No. 1,975,325 for an ANTISKID CHAIN AND MEANS FOR APPLYING AND REMOVING SAME;
- U.S. Pat. No. 2,241,923 for an AUTOMATIC EMERGENCY TRACTION DEVICE FOR AUTOMOBILES;
- U.S. Pat. No. 2,264,466 for an ANTISKID DEVICE FOR VEHICLES;
- U.S. Pat. No. 2,277,036 for an ANTISKID DEVICE;
- U.S. Pat. No. 2,283,948 for an AUTOMOBILE TRACTION DEVICE;
- U.S. Pat. No. 2,442,322 for an ANTISKID DEVICE;
- U.S. Pat. No. 4,299,310 for an ANTISKID DEVICE FOR MOTOR VEHICLES; and
- U.S. Pat. No. Des. 286,524 for ANTI SKID CHAIN UNIT FOR VEHICLE TIRES.

Referring now to FIG. 1, a modern rapidly-deployable snow chain system 100 is depicted in its deployed configuration in this rear elevational view drawing. The snow chain system 100 is removably affixed to a drive axle 101 which incorporates a differential unit 102. Inner and outer road wheels (103A and 103B, respectively) are mounted on the visible half of the drive axle 101. On each road wheel (103A and 103B) is mounted a rubber tire (104A and 104B, respectively). The chain system 100 includes a friction drive disc 105 to which a plurality of chain segments 106A, 106B and 106C are attached. Chain segment 106A is depicted as being below the road surface 114, which is normally covered with a layer of snow or ice when the chain system 100 is in the deployed configuration. The friction drive disc 105 is rotatably mounted on a spindle 107 which is affixed to a support member 108 which is pivotally mounted to a mounting bracket 109. The mounting bracket is, in turn, bolted to the suspension spring shackle 113 which secures the suspension leaf springs 112 to the drive axle 101. The chain system 100 also includes a pneumatic cylinder 110 that is bolted to the mounting bracket 109. The pneumatic cylinder 110 has a slidable piston 111 that is held in a normally retracted position within cylinder 110 by spring biasing when pressure within cylinder 108 equals ambient pressure. The outer end of piston 111 is connected to support member 108. In the deployed configuration, the outer rim of friction drive disc 105 is pressed against the sidewall of tire 104A by a biasing force applied to support member 108 by piston 111. The biasing force is provided by pneumatic pressure inside pneumatic cylinder 110 which overcomes the spring biasing and causes piston 111 to extend. As the tire 104A rotates, the friction drive disc 105 also rotates with the chain segments 106 extended more or less radially therefrom. Thus each chain segment 106 is flung, sequentially, beneath the tread portion of tire 104A. In order to retract the system and disengage the friction drive disc 105 from contact with the sidewall of tire 104A, pneumatic pressure to pneumatic cylinder 110 is cut off, causing piston 111 to retract within cylinder 110 and raising the support member 108, the rotatably attached friction drive disc 105 and the attached chain segments 106. In the retracted configuration, the chain segments 106 do not touch the road surface 114.

Several friction drive disc designs are presently in use. As a particular friction drive disc design places constraints on the design of chain segment attachment devices, it is not surprising that there are several types of chain segment attachment devices. FIGS. 2, 3 and 4 depict various views of one type of friction drive disc 200. This type of friction drive disc 200 has a planar upper surface 201 and a pattern of bolt holes 202 which penetrate and are perpendicular to the planar surface 201. The friction drive disc 200 has a molded-on plastic or rubber rim 203 that rides on the sidewall of a tire 104A during deployment (see FIG. 1), causing the friction drive disc 200 to spin and sequentially throw chain segments beneath the tire. The rim 203 has a tread pattern which facilitates the transfer of rotational energy from the tire 104A to the friction drive disc 200 through frictional contact. The friction drive disc assembly 200 also has a cylindrical bearing cavity 204 in which one or more roller bearing assemblies (not shown) are secured with a snap ring (not shown) that fits within snap-ring groove 205. A hole 206 is sized and threaded to accept a Zerk fitting, through with grease may be injected into the roller bearing assemblies. A ring-shaped chain segment retaining plate assembly 500 is bolted to the planar surface 201 with bolts 501. Each chain segment (not shown, but identical to 106A, 106B and 106C of FIG. 1) has a final U-shaped link 502 that is welded to a ring-shaped laminar plate 503. Although the assembled friction drive disc 200 and chain retaining plate assembly 500 is strong and durable, it suffers from the drawback that individual chain segments (not shown) cannot be replaced without removing all of the bolts 501, the entire chain retaining plate assembly 500, cutting or grinding off the U-shaped link 502 that secures the defective chain segment to the plate assembly 500, and rewelding a new U-shaped link 502 with a new attached chain segment in the proper location on the chain retaining plate assembly 500. Without access to a grinder and welding equipment, replacement of a single chain segment is impossible.

Though not shown in this disclosure, another type of friction drive disc has been used in the industry. Each chain segment has a final U-shaped link that is welded to a more-or-less rectangular laminar metal plate which fits snugly within a recess that has been either cast or machined on the lower surface of the friction drive disc. Each rectangular laminar plate is bolted to the friction drive disc with a single bolt. Although each of the mounted chain segments can be individually replaced by removing a single bolt, the drawbacks to this design are greater complexity (the friction drive disc must receive additional machining in order to create the recesses) and wear of the recesses caused by pivoting of the rectangular plates about their respective retaining bolts. As the recesses wear, the magnitude of plate pivot increases, as does the rate of wear. Eventually, the friction drive disc will have to be replaced.

What is needed is a new type of chain segment retaining plate assembly which will fit the type of friction drive disc depicted in FIGS. 2, 3 and 4, and which combines the advantages of both types of assemblies, but none of the drawbacks of either.

SUMMARY OF THE INVENTION

The invention fills the heretofore expressed need for a friction drive disc and chain segment retaining plate assembly which has great structural integrity, and which provides for simplified replacement of individual chain segments. The new friction drive disc and chain segment assembly utilizes a friction drive disc of the type depicted in FIGS. 2, 3 and 4. However, each chain segment or chain segment pair has its own attachment plate which can be individually replaced. The attachment plate is unique in that it is a arcuate section of ring. Multiple attachment plates are placed end to end to make a circular ring. A first attachment plate has a tab on a first-handed side (e.g., the right side) which fits into a recess within the opposite-handed side (e.g., the left side) of a second, neighboring attachment plate. The first attachment plate also has a recess on its opposite-handed side (e.g., the left side) which receives a tab from first-handed side of a third, neighboring attachment plate. In this manner, each of the attachment plates is locked to the attachment plates on either side, and an integer number of plates so interlocked form a ring. The ring is bolted to the friction drive disc with a bolt through each anchoring plate. The interlocking nature of the attachment plates minimize rotational movement of individual plates about their associated anchoring bolts.

For a first embodiment of the invention, a single chain segment is attached to its own arcuate chain attachment plate via a U-shaped link that is welded to the attachment plate. For a second embodiment of the invention, a pair of chains is attached to a single arcuate chain attachment plate via an M-shaped link that is welded to the attachment plate. Except for the number of chain segments attached to the plate and the shape of the final link welded to the arcuate chain attachment plate, the two embodiments are identical. That is, all plates interlock to form a ring, which is bolted to the friction drive disc.

An alternative, though not preferred, embodiment is possible for each of the first and second embodiments. Two types of attachment plates are fabricated. One type has tabs on both abutting sides thereof; the other has recesses on both abutting sides thereof. A ring is assembled from alternating types of attachment plates to which the chain segment (or segments) is (are) attached as described above. This embodiment suffers from the obvious disadvantage of requiring two types of attachment plates rather than a single type. In any case, the invention is deemed to include these alternative, unpreferred embodiments (though not specifically shown and described in this disclosure) under the judicially-recognized Doctrine of Equivalents.

BRIEF DESCRIPTION OF THE DRAWINGS

FIG. 1 is a rear elevational view of a typical modern rapidly-deployable snow chain system;

FIG. 2 is a top plan view of a friction drive disc;

FIG. 3 is a cross-sectional view of the friction drive disc of FIG. 2 through line 3—3, which further shows a molded-on rubber rim;

FIG. 4 is a cross-sectional view of the friction drive disc of FIG. 2 through line 4—4, which also shows the molded-on rubber rim;

FIG. 5 is a top plan view of a prior art chain segment attachment plate designed to bolt to the friction drive disc of FIGS. 2, 3 and 4;

FIG. 6 is a cross-sectional view of the chain segment attachment plate of FIG. 5 through line 6—6;

FIG. 7 is a top plan view of a first embodiment of a new interlocking arcuate chain segment attachment plate section;

FIG. 8 is a side elevational view of the U-shaped attachment link;

FIG. 9 is a top plan view of a second embodiment of a new interlocking arcuate chain segment attachment plate section;

FIG. 10 is a side elevational view of the M-shaped attachment link;

FIG. 11 is a top plan view of six of the new arcuate chain segment attachment plate sections depicted in FIG. 7 interlocked with one another; and FIG. 12 is a top plan view of six of the new arcuate chain segment attachment plate sections depicted in FIG. 9 interlocked with one another.

PREFERRED EMBODIMENT OF THE INVENTION

The invention is an improved snow chain system for wheeled vehicles of the type that can be rapidly deployed and rapidly retracted. In many respects, the system is similar to the one depicted in FIG. 1 (see the description in the background section). The improvements to the system are limited to the chain segment attachment plate assembly. When the friction drive disc and chain segment assembly of the present invention is completely assembled, its appearance is much like that of a completely assembled friction drive disc and chain segment assembly of the type depicted in FIGS. 2 and 5. The difference is that the ring-shaped plate 503 to which all chain segments are welded in the assembly of FIG. 5 is comprised of multiple arcuate chain-attachment plates, each with a tab and recess, which interlock, much like a laminar puzzle, to form a ring-shaped unit. The ring-shaped unit is held together and to the friction drive disc 200 by a plurality of bolts, each of which is associated with a single arcuate plate. Each arcuate plate has either one or two chain segments attached thereto.

Referring now to FIG. 7, a single arcuate chain-attachment plate 700 assembly, having an arcuate laminar plate 701 and a U-shaped anchoring link 702, is depicted in a top plan view. The U-shaped link is bent upwardly at an angle of 30° at bend line 706. This bend is clearly visible in the side view of U-shaped link 702 depicted in FIG. 8. On the right end of the plate 701 is a tab 703; on the left end is a recess 704. A hole 705 in the center of laminar plate 701 is sized to accept an anchoring bolt (see item 1101 of FIG. 11) which will secure the plate assembly 700 to the friction drive disc such as friction drive disc 200 in FIG. 2. When six of these plate assemblies are positioned end-to-end, with the tab 703 of each plate 701 interlocking with the recess 704 of its adjacent neighboring plates, a ring is formed. The U-shaped link 702 is welded to the plate 701 after inserting it through the end of a single chain segment (see FIG. 1).

Referring now to FIG. 9, a single arcuate chain-attachment plate 900 assembly, having an arcuate laminar plate 701 and a heart or M-shaped anchoring link 902, is depicted in a top plan view. The hear-shaped link 902 has a pair of loops 907A and 907B, each of which is adapted to secure a single chain segment. Except for the heart-shaped link 902, to which two chain segments may be attached, the chain-attachment plate assembly 900 is identical to the chain-attachment plate assembly 700 of FIG. 7. The heart-shaped link 902 is welded to the plate 701 after inserting it through the end of each of a pair of chain segments (not shown).

Referring now to FIG. 11, a top plan view of six interlocked chain-attachment plate assemblies 700 is depicted. The interlocked assemblies form a chain attachment ring assembly 1100. Once the ring assembly 1100 is bolted to a friction drive disc such as item 200 of FIG. 2, the interlocking of the tabs 703 and the recesses 704 inhibits twisting of each plate assembly 700 about its anchoring bolt 1101.

Referring now to FIG. 12, a top plan view of six interlocked chain-attachment plate assemblies 900 is depicted. The interlocked assemblies form a chain attachment ring assembly 1200. Once the ring assembly 1200 is bolted to a friction drive disc such as item 200 of FIG. 2, the interlocking of the tabs 703 and the recesses 704 inhibits twisting of each plate assembly 900 about its anchoring bolt 1101.

For the chain attachment plate assembly 700 of FIGS. 7 and 11, as well as for the chain attachment plate assembly 900 of FIGS. 9 and 12, the anchoring link 702 and the anchoring link 902 act to prevent the retaining bolt 1101 from turning when a nut is being tightened on the opposite end of the bolt.

It should be evident that the heretofore described apparatuses are capable of providing a snow chain attachment ring which has excellent structural integrity and which facilitates replacement of individual chain segments or chain segment pairs without grinding, cutting or welding and without removing chain segments which are still serviceable.

Although only several embodiments of the adjustment mechanism are shown and described, it will be obvious to those having ordinary skill in the art that changes and modifications may be made thereto without departing from the scope and the spirit of the invention as hereinafter claimed. For example, an alternative, though not preferred, embodiment is possible for the arcuate laminar chain attachment plates 701. Instead of using a plurality of one type of laminar attachment plate 701, each of which has a tab and a recess, an equal number of two types of different plates are fabricated. One type has tabs on both ends thereof; while the other has recesses on both ends thereof. A ring is assembled from alternating types of attachment plates to which the chain segment (or segments) is (are) attached as described above. This embodiment suffers from the obvious disadvantage of requiring two types of attachment plates rather than a single type. Another alternative, though not preferred, embodiment utilizes flexible members such as cable segments in place of the chain segments. The end of each cable segment can be looped through a U-shaped anchoring link, doubled back on itself and secured with a crimp sleeve. Or two cable segments can be similarly looped through an M-shaped anchoring link. However, cables are not nearly as durable as chains, and therefore chain segments are the flexible members utilized for the preferred embodiment. In any case, the invention should be considered to include these alternative, unpreferred embodiments under the judicially-recognized Doctrine of Equivalents.

What is claimed is:

1. In a rapidly-deployable traction system for tire-equipped vehicles of the type having a plurality of flexible members radially attached to a lower face of a rotatably-mounted drive disc having a rim adapted to frictionally engage the sidewall of a tire so that as the tire spins, the flexible members will be thrown by centrifugal force more or less radially beneath the tread of the tire, an improved flexible member attachment ring which is secured to the drive disc, said attachment ring comprising:

a plurality of arcuate plates, which, when placed end to end, form said attachment ring, each plate having a central aperture appropriately sized to receive a bolt by means of which that plate is individually secured with a bolt to said drive disc, each plate being equipped with geometry at each end thereof which interlocks with that of an adjacent plate, and each plate having means for securing at least one flexible member.

2. The rapidly-deployable traction system of claim 1, wherein each flexible member is a chain segment.

3. The rapidly-deployable traction system of claim 2, wherein said means for securing is a U-shaped anchoring link that is welded to the plate, said U-shaped anchoring link both locking the head of the securing bolt to prevent its rotation and securing a single chain segment.

4. The rapidly-deployable traction system of claim 2, wherein said means for securing is an M-shaped anchoring link that is welded to the plate, said M-shaped anchoring link both locking the head of the securing bolt to prevent its rotation and securing a pair of chain segments.

5. The rapidly-deployable traction system of claim 1, wherein said geometry at each end thereof comprises a tab at one end and a recess at the other, the tab and recess interlocking with the recess and tab, respectively, of an adjacent pair of plates.

6. The rapidly-deployable traction system of claim 5, wherein said tab and said recess are more or less rectangularly shaped.

7. A rapidly-deployable traction system for tire-equipped vehicles comprising:

a rotatably-mounted drive disc having a more or less planar lower face and a rim adapter to frictionally engage the sidewall of a tire so that the drive disc will spin as the tire spins;

a plurality of flexible members;

a plurality of arcuate plates, which, when placed end to end, form a flexible member attachment ring, each plate having a central aperture appropriately sized to receive a bolt by means of which that plate is individually securable to said drive disc, each plate being equipped with geometry at each end thereof which interlocks with that of an adjacent plate, and each plate having an anchoring link welded thereto for securing at least one flexible member, so that the flexible members collectively secured to said attachment ring extend more or less radially therefrom as said drive disc spins, being thrown sequentially beneath the tread portion of said tire.

8. The rapidly-deployable traction system of claim 7, wherein each flexible member is a chain segment.

9. The rapidly-deployable traction system of claim 8, wherein each anchoring link is U-shaped and locks the head of the securing bolt to prevent its rotation, said U-shaped anchoring link securing a single chain segment.

10. The rapidly-deployable traction system of claim 8, wherein each anchoring link is M-shaped and locks the head of the securing bolt to prevent its rotation, said M-shaped anchoring link securing a pair of chain segments.

11. The rapidly-deployable traction system of claim 7, wherein said geometry at each end thereof comprises a tab at one end and a recess at the other, the tab and recess interlocking with the recess and tab, respectively, of an adjacent pair of plates.

12. The rapidly-deployable traction system of claim 11, wherein said tab and said recess are more or less rectangularly shaped.

13. A rapidly-deployable traction system for tire-equipped vehicles comprising:

a rotatably-mounted drive disc having a more or less planar lower face and a rim adapted to frictionally engage the sidewall of a tire so that the drive disc will spin as the tire spins;

a plurality of flexible chain segments;

a plurality of arcuate plates, which, when placed end to end, form a chain segment attachment ring, each plate having a central aperture appropriately sized to receive a bolt by means of which that plate is individually securable to said drive disc, each plate being equipped with geometry at each end thereof which interlocks with that of an adjacent plate, and each plate having an anchoring link welded thereto for securing at least one chain segment, so that the chain segments collectively secured to said attachment ring extend more or less radially therefrom as said drive disc spins, being thrown sequentially beneath the tread portion of said tire.

14. The rapidly-deployable traction system of claim 13, wherein each anchoring link is U-shaped and locks the head of the securing bolt to prevent its rotation, said U-shaped anchoring link securing a single chain segment.

15. The rapidly-deployable traction system of claim 13, wherein each anchoring link is M-shaped and locks the head of the securing bolt to prevent its rotation, said M-shaped anchoring link securing a pair of chain segments.

16. The rapidly-deployable traction system of claim 13, wherein said geometry at each end thereof comprises a tab at one end and a recess at the other, the tab and recess interlocking with the recess and tab, respectively, of an adjacent pair of plates.

17. The rapidly-deployable traction system of claim 16, wherein said tab and said recess are more or less rectangularly shaped.

* * * * *